June 12, 1928.  1,673,786

O. F. WARHUS

VEHICLE

Filed Aug. 6, 1926   8 Sheets-Sheet 2

Fig. 2.

INVENTOR
Oliver F. Warhus
BY
ATTORNEYS

June 12, 1928. 1,673,786
O. F. WARHUS
VEHICLE
Filed Aug. 6, 1926 8 Sheets-Sheet 3

INVENTOR
Oliver F. Warhus
BY
ATTORNEYS

June 12, 1928.

O. F. WARHUS

VEHICLE

Filed Aug. 6, 1926

Patented June 12, 1928.

1,673,786

UNITED STATES PATENT OFFICE.

OLIVER F. WARHUS, OF ALBANY, NEW YORK, ASSIGNOR TO VERSARE CORPORATION, A CORPORATION OF NEW YORK.

VEHICLE.

Application filed August 6, 1926. Serial No. 127,505.

This invention relates to vehicles such as automobile passenger coaches, automobile freight trucks, railway cars and the like. More particularly, the invention relates to an improved body construction for large vehicles of the type just mentioned and to an improved manner of supporting the body on the front and rear sets of wheels.

The usual way of mounting the body of a vehicle is to support it on a chassis frame which in turn is supported on the wheels. The chassis frame receives the stresses resulting from supporting the vehicle at the front and rear ends and thus relieves the body frame of those stresses. The chassis frame principle has heretofore been utilized in practically all vehicles from automobiles of the small type to large automobile passenger coaches and freight trucks. Likewise, the chassis frame principle is found in railway freight cars and passenger coaches because the body is supported on longitudinal sills which extend from one bogie truck to the other.

According to this invention the chassis frame is entirely dispensed with and the body is supported directly on the front and rear sets of wheels, the body frame being so fabricated that it is capable of receiving and withstanding the stresses that are ordinarily received by the chassis frame. The major portion of the body frame is built from duplicate units so that a frame of any desired length may be quickly and readily constructed by bolting together the requisite number of such duplicate units and adding to them the remaining specially shaped parts that are necessary to complete the frame.

The improved body construction was designed especially for use in large automobile passenger coaches and freight trucks having eight wheels, four of which are associated with a front bogie truck and four of which are associated with a rear bogie truck. The invention has therefore been illustrated in the accompanying drawings as applied to a vehicle of this type and this particular application of the invention will be specifically described. However, the invention may be applied to automobile passenger and freight vehicles having more or less than eight wheels, for instance to vehicles of the six wheel type. Likewise, the invention is also applicable to railway passenger and freight cars.

Figure 1:
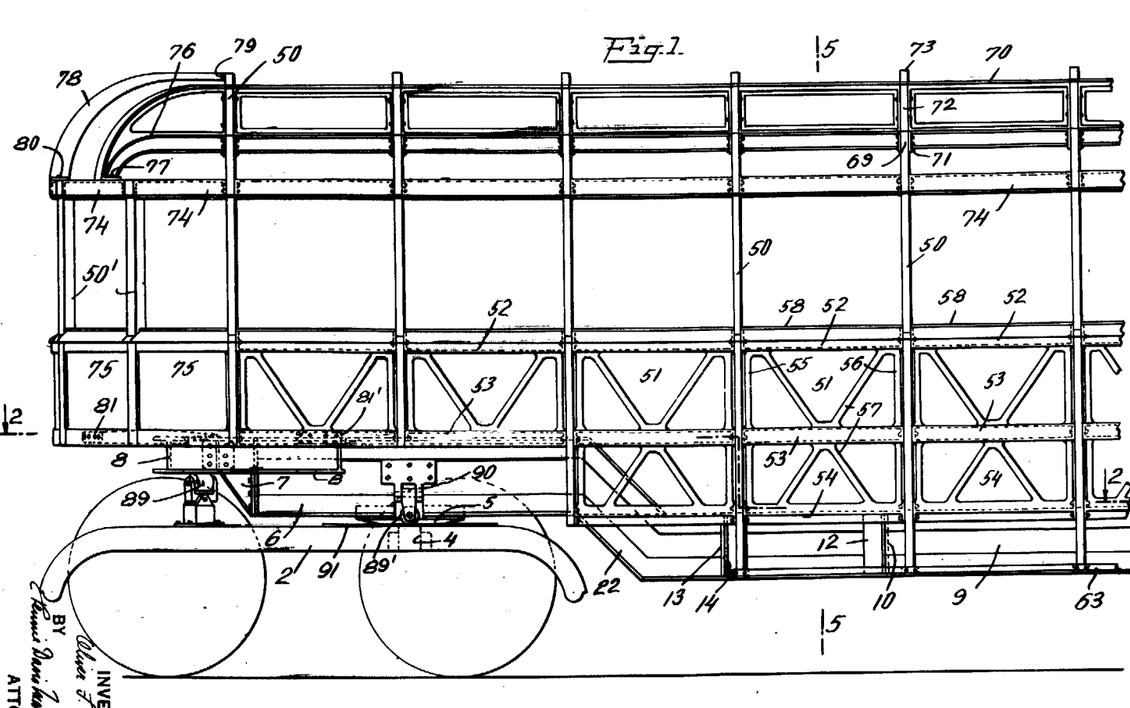
Fig. 1 is a side elevation of the rear portion of a body frame constructed in accordance with the invention.
Figure 2:
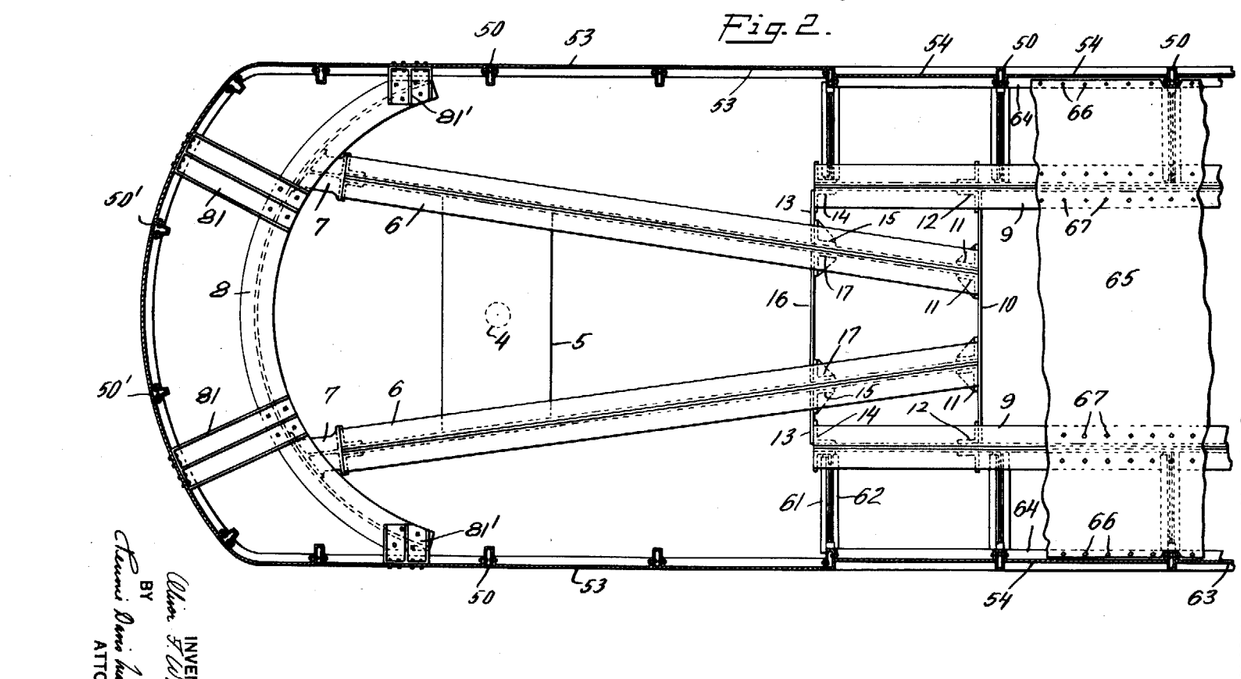
Fig. 2 is a horizontal section taken on the line 2—2 of Fig. 1.
Figure 3:
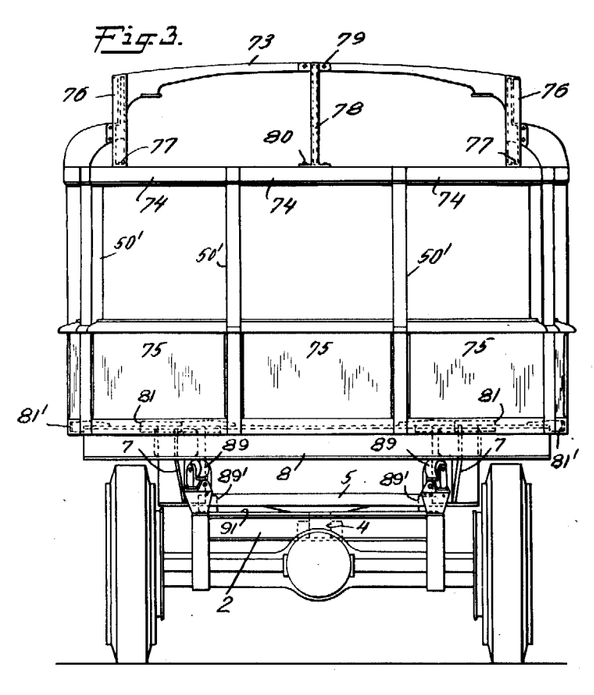
Fig. 3 is a rear elevation of the body frame shown in Fig. 1.
Figure 4:
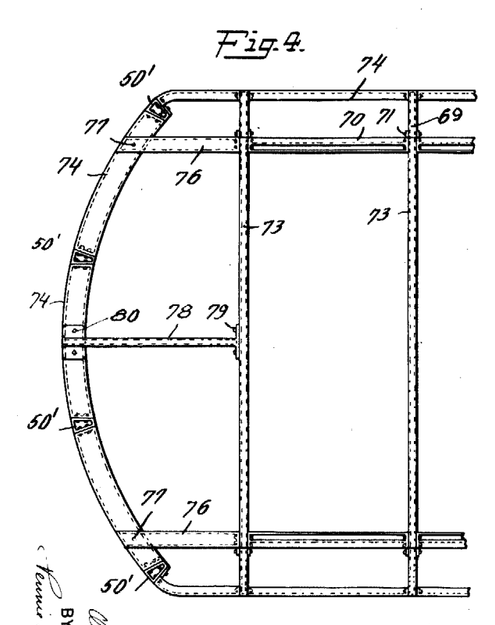
Fig. 4 is a top plan view of Fig. 3.
Figure 9:
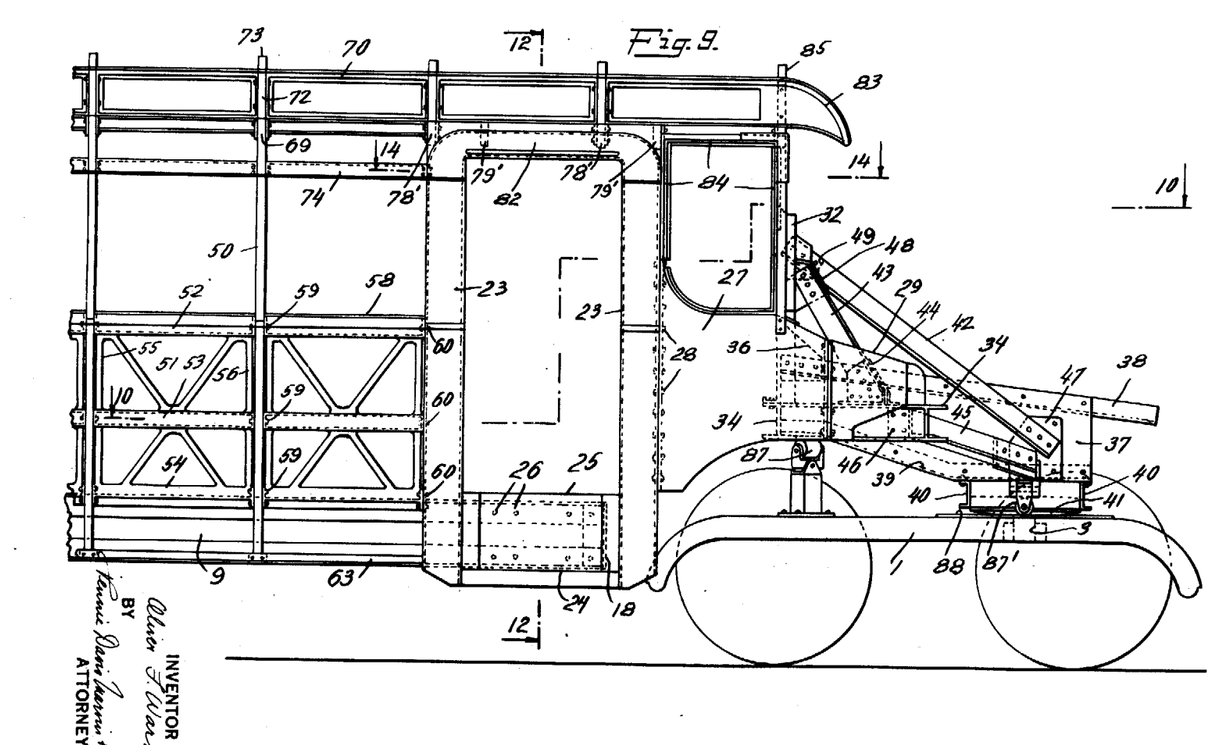
Fig. 9 is a side elevation of the forward end of the body frame.
Figure 10:
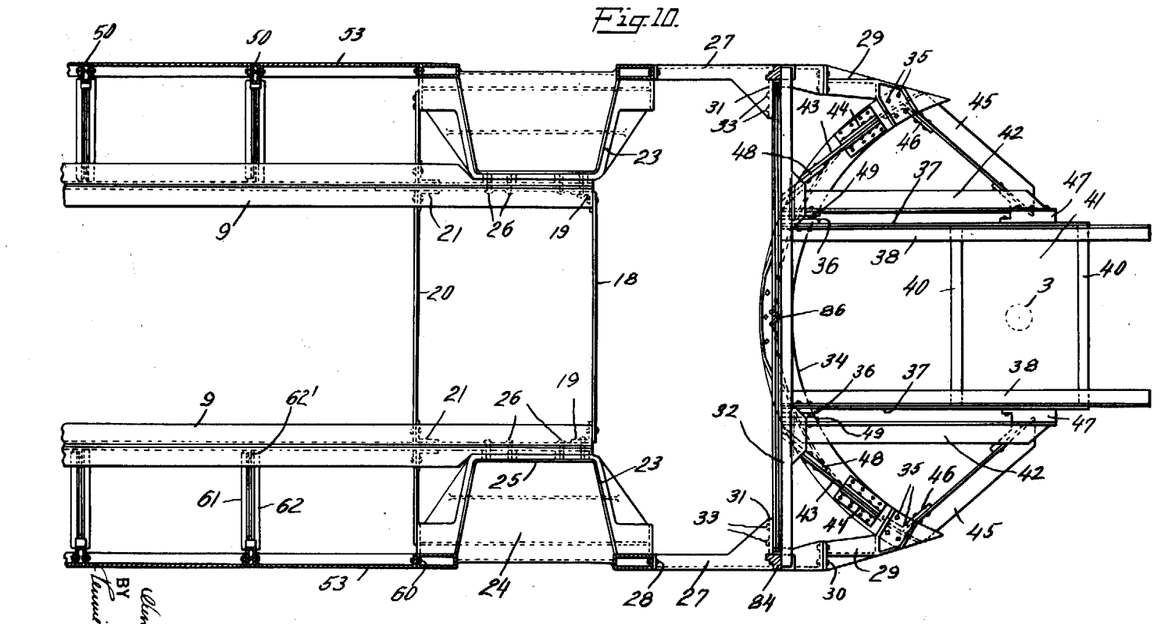
Fig. 10 is a horizontal section taken on the line 10—10 of Fig. 9.

Figs. 1 and 9 are complementary views as these figures in conjunction show the entire body frame in side elevation. Likewise, Figs. 2 and 10 are complementary views and show the entire body frame partly in horizontal section and partly in plan view. Referring first to these four figures it will be seen that the body frame is mounted upon a front bogie truck 1 and a rear bogie truck 2. The front portion of the body frame has associated with it a king pin 3 which is received by a king pin socket in the frame of the front bogie truck, and likewise the rear portion of the body frame has associated with it a king pin 4 which is received by a king pin socket in the frame of the rear bogie truck. The king pins and their sockets form pivotal connections between the body frame and the bogie trucks so that each truck is free to swivel with respect to the body. The details of the bogie trucks themselves, other than the fifth wheel construction hereinafter described for supporting the weight of the body on the bogie trucks have no bearing on the present invention and, therefore, have been omitted in the drawings. It might be stated, however, that the spring suspension for the wheels is disclosed in my copending application, Serial No. 127,504, filed Aug. 6, 1926. The steering mechanism for the front wheels of the front bogie truck is disclosed in my copending application, Serial No. 745,875, filed October 25, 1924. The steering mechanism for the front wheels of the rear bogie truck is disclosed in the patent to Schvartz, No. 1,559,050. The bogie trucks may be propelled by electric motors in the manner shown in my copending application, Serial No. 58,743, filed Sept. 26, 1925.

The rear king pin 4 is mounted on a plate 5 (Fig. 2) which in turn is secured to two longitudinal I-beams 6 which are connected at their rear ends by means of brackets 7 to a curved rear beam 8. The longitudinal I-beams 6 extend forwardly to a point just in advance of the rear bogie truck where they are connected to another pair of longitudinal I-beams 9 which extend forwardly toward the front of the vehicle, but which terminate short of the front bogie truck as will be hereinafter described. The ends of the I-beams 6 overlap the ends of the I-beams 9 but they are all arranged in the same plane. The connection between the two sets of I-beams may be effected by means of a flat vertical plate 10 which is secured to the forward ends of the I-beams 6 by means of brackets 11 and which is secured to the I-beams 9 by means of brackets 12. Plate sections 13 are secured to the rear ends of the I-beams 9 by means of brackets 14 and are secured to the I-beams 6 by means of brackets 15. An intermediate plate 16 forms a continuation of the plate sections 13 and is fastened at its ends to the I-beams 6 by means of brackets 17. The forward ends of the I-beams 9 are shown in Fig. 10. Their extreme ends are interconnected by means of a flat vertical plate 18 through the intermediary of brackets 19, and a short distance to the rear of the plate 18 a second plate 20 is located which is connected to the I-beams 9 by means of brackets 21. It should be particularly noted that the I-beams 9 do not extend all of the way to the front bogie truck and are not supported upon it so that the two sets of I-beams 6 and 9 do not perform the function of the usual chassis frame. They do, however, form a support for the flooring as will hereinafter appear and they also serve as a structural part of the body frame itself and as a foundation to which certain other parts of the body frame may be anchored. The rear I-beams 6 are provided with a vertical offset 22 (Fig. 1) which provides the necessary clearance at the rear end for the rear bogie truck 2.

Figure 11:
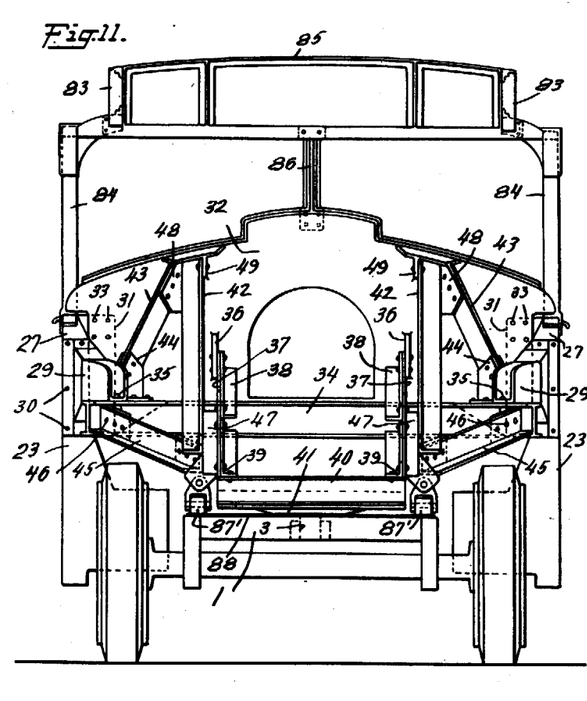
Fig. 11 is a front elevation of Fig. 9 certain of the structural members being shown in perspective.
Figure 12:
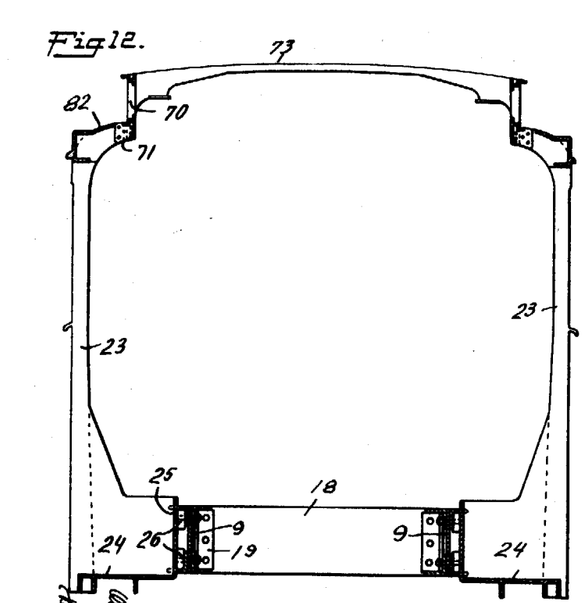
Fig. 12 is a transverse section taken on the line 12—12 of Fig. 9.
Figures 13, 14, 15:
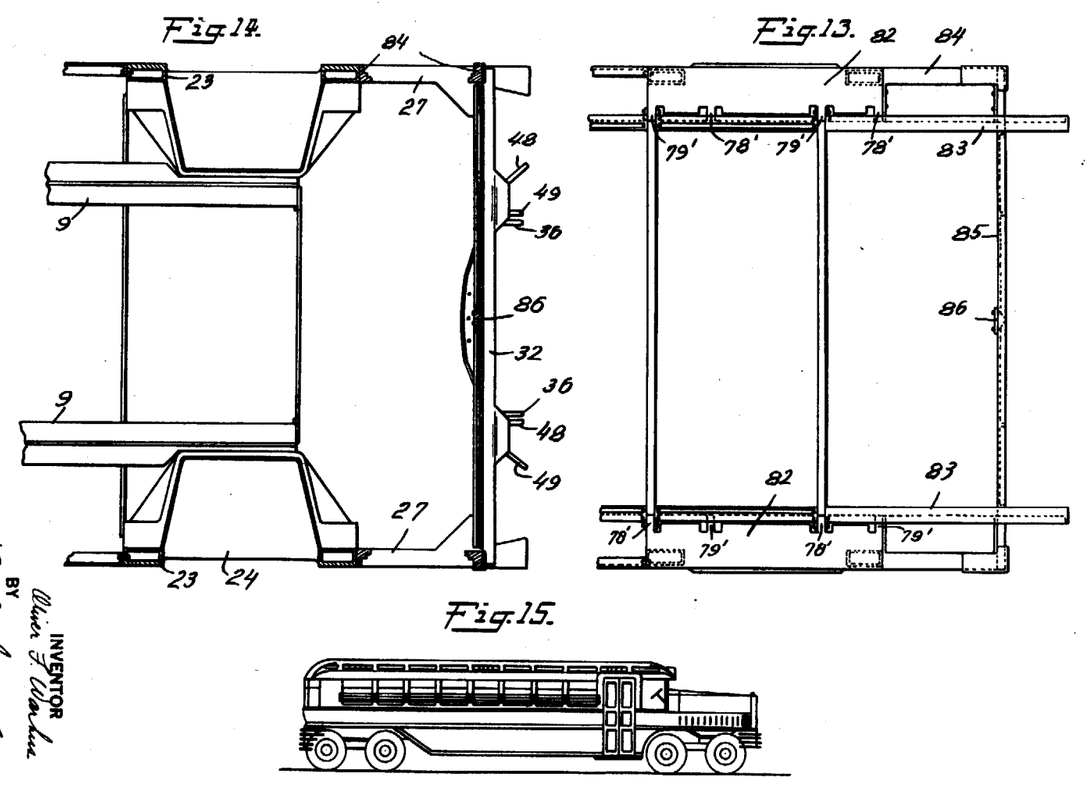
Fig. 13 shows a portion of the body frame as viewed from a point directly above the door frames.
Fig. 14 is a horizontal section taken on the line 14—14 of Fig. 9.
Fig. 15 is a side elevation of the completed vehicle.

Practically all of the remaining structural elements of the body frame are aluminum-alloy castings. It has been found in practice that when the parts are made and assembled substantially in the manner hereinafter described practically the entire body frame can be fabricated from aluminum-alloy castings and yet the body will possess sufficient strength to be supported at its front and rear ends directly on the bogies. These castings include a pair of door frames 23 one of which is located at each side of the vehicle. The side members and the upper and lower cross members of each door frame are all cast in one piece as shown in Fig. 9 and the lower cross piece is so shaped as to form a step having a tread 24 and a rear vertical wall 25 as best shown in Figs. 9, 10 and 12. The rear vertical wall 25 of the step is bolted or riveted to the side of the adjacent longitudinal I-beam 9 as shown at 26. The forward vertical edge of each door frame 23 is fastened to a casting 27 as shown at 28 (Figs. 9 and 10) and each casting 27 is in turn fastened to another forwardly projecting casting 29 as shown at 30. The two castings 27 are so shaped as to provide integral lugs 31 which are rigidly fastened to a ponderous transversely extending casting 32 as shown at 33. The casting 32 constitutes the dash frame. It is formed of one piece and extends entirely across the vehicle as shown in Fig. 11. This view also indicates the vertical height of the casting. It is fastened at its lower edge to the central portion of a curved I-beam 34. The ends of the I-beam 34 project forwardly beyond the dash casting 32 as clearly shown in Fig. 10 and the forward ends of the castings 29 are secured to the upper surface of the I-beam ends as shown at 35. The dash casting 32 is also provided with a pair of integral lugs 36, spaced apart transversely of the vehicle, and to each of these brackets is secured a vertical forwardly extending plate 37. The plates 37 are reinforced at their upper edges by angle irons 38 and at their lower edges by angle irons 39. Extending transversely between the plates 37 is a pair of channel bars 40 the upper flanges of which may be secured to the horizontal flanges of the angle irons 39 as best shown in Figs. 9, 10 and 11. The channel bars 40 carry between them a plate 41 on which the king pin 3 is mounted.

The plates 37 and the transversely extending channel bars 40 form a supporting bed for the internal combustion engine and its associated parts. A pair of downwardly inclined struts 42 extend from the upper edge of the dash casting 32 to the outer sides of the plates 37, and a pair of downwardly inclined tie-plates 43 extend from approximately the same points on the dash casting to brackets 44 which are secured to the upper surface of the curved I-beam 34 near its ends. A pair of substantially horizontal braces 45 are secured to the ends of the curved I-beam 34 as shown at 46 and extend to the plates 37 where their ends are secured to brackets 47 which in turn are fastened to the plates 37. The brackets 47 are so shaped that the forward ends of the struts 42 may also be secured to them. The dash casting 32 is provided with a pair of integral lugs 48 to which the tie-plates 43 are fastened and is also provided with a pair of integral lugs 49 to which the ends of the struts 42 are secured. The three members 42, 43 and 45 at each side of the vehicle form a triangle, the strut 42 serving as a compression member, the tie 43 as a tension member and the brace 45 as a lateral bracing member. The struts 42 and braces 45 are preferably in the form of angle irons while the ties 43 may be flat strips or plates.

Figures 5, 6, 7, 8:
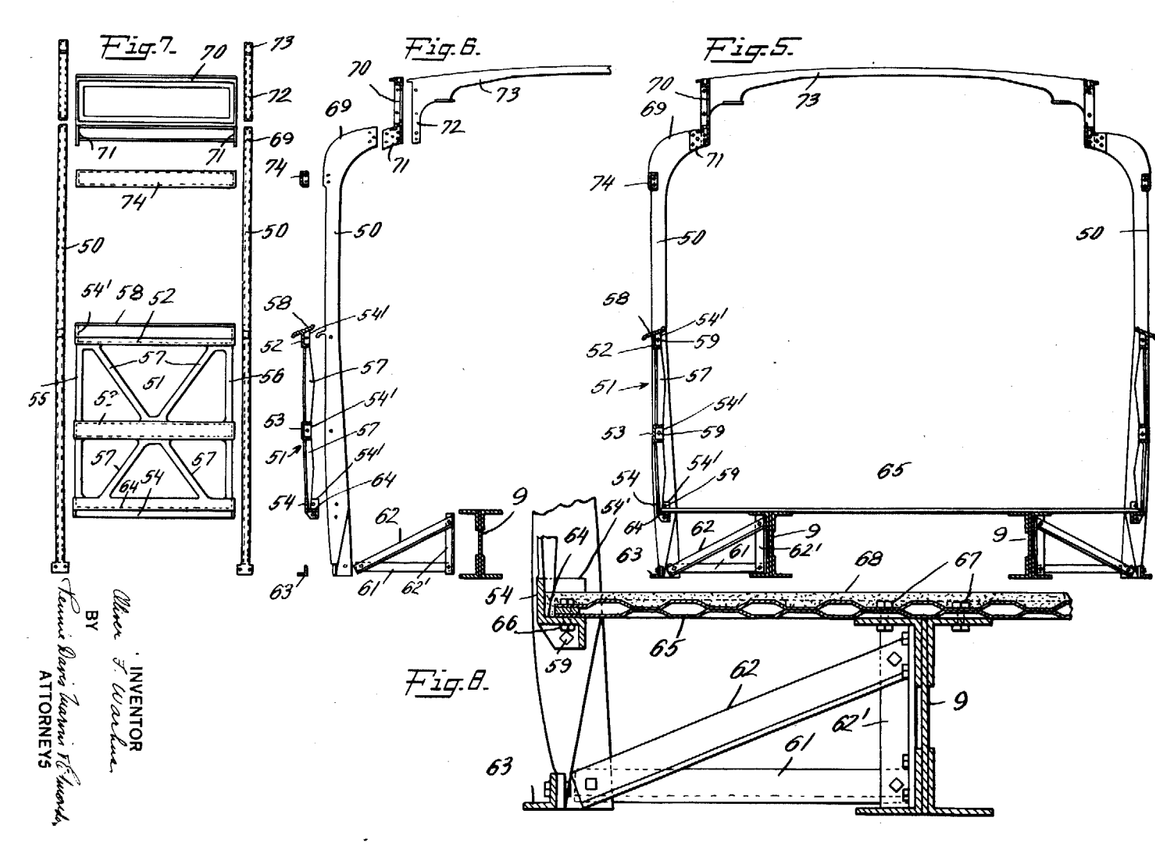
Fig. 5 is a transverse vertical section taken on the line 5—5 of Fig. 1.
Fig. 6 is a broken transverse vertical section through one side of the body frame illustrating the manner in which certain of the structural elements are assembled.
Fig. 7 is a side elevation of certain parts of the body frame illustrating the manner in which they are grouped and assembled.
Fig. 8 is an enlargement of the lower left-hand corner of Fig. 5 slightly elaborated to bring out other details of construction.

The side walls of the body frame are made up of a plurality of vertical pillars 50 spaced apart at intervals as shown in complementary Figures 1 and 9, and complementary Figures 2 and 10. Located between each pair of pillars 50 is a rectangular truss member 51 having upper, intermediate and lower horizontal cross pieces 52, 53 and 54 respectively, vertical side members 55 and 56 and longitudinally ribbed, diagonal braces 57. Fig. 7 shows one of these truss members by itself. The cross pieces 52, 53 are channel-shaped in cross section and the cross pieces 54 are L-shaped in cross section and all of them have end walls 54' which may be bolted or riveted to the pillars, as best shown in Fig. 6. The vertical height of the truss members 51 is such that they extend upwardly to the lower edge of the windows. The upper cross piece 52 of each truss member is so shaped as to form a window sill 58 as shown in Figs. 5 and 6. In assembling the body frame a truss member 51 is positioned between each pair of pillars 50 and each pillar is bolted or riveted between a pair of truss members as shown at 59 in Fig. 9. The first truss member 52 at each side of the vehicle is fastened directly to the door frame 23 as shown at 60 in Fig. 9. All of the pillars 50 except those which are over the rear bogie truck extend downwardly beyond the rectangular truss members 51 and the lower end of each pillar is connected to one of the I-beams 9 by means of a horizontal brace 61 and a diagonal brace 62 as best shown in Figs. 5, 6 and 8. Each pair of braces 61 and 62 is connected to the I-beam by means of a bracket 62'. A horizontal rail 63 extends longitudinally of the vehicle and is fastened to the lower ends of all of the pillars which extend below the truss members. The lower cross piece 54 of each truss member is so shaped as to provide a ledge 64. All of these ledges in conjunction at each side of the vehicle form a seat for the edge portion of a metallic flooring 65 which is fastened to the ledges 64 as shown at 66. The metallic flooring is supported upon and secured to the horizontal flanges of the I-beams 9 as shown at 67. The metallic flooring may be in the form of metallic sheets which are embossed in such a way that when two of the sheets are superposed the projections on one sheet abut against the projections on the other sheet to form a metallic structure of appreciable thickness and strength, but of small weight. The metallic sheets may be covered with concrete or any flooring composition as shown at 68. It should here be noted that the metallic flooring plays a structural part in the framework because that portion of the metal flooring between each I-beam 9 and the outer wall of the body frame acts as a horizontal spacing and bracing member for the pillars and the truss members. The extreme lower ends of the pillars are braced by the horizontal braces 61 so that the entire side wall including the pillars and rectangular truss members are braced by two sets of horizontal members located at different heights (braces 61 and flooring 65). The upper ends of the pillars are held in proper position by the roof carlins and transom members which will now be described.

The upper end of each of the pillars 50 is curved inwardly as shown at 69 in Figs. 5 and 6 and between the ends of every two pillars there is bolted or riveted a transom frame and carlin brace 70. Each transom frame 70 has at each lower corner a laterally extending lug 71 by means of which two transom frames may be secured together with the extreme end of the pillar between them. The transom frames 70 also receive between them downwardly extending end portions 72 of the roof carlins 73. The end portion of a carlin is positioned between two transom frames and adjacent to the extremity of the corresponding pillar and the end walls of the two transom frames are then bolted or riveted together with the carlin between them. Figs. 6 and 7 show these parts grouped ready for assembly, but unattached, and Fig. 5 shows them in their assembled condition. The roof construction, it will be noted, is of the monitor type. Every two pillars 50 just below the bend 69 have fastened between them a channel-shaped window cope 74. The pair of pillars 50 immediately adjacent the forward end of the rear bogie truck do not extend down below the truss member 51 as shown in Fig. 1. All of the truss members to the rear of this pair of pillars terminate at the intermediate cross piece 53 because this is the floor level at this part of the vehicle and the edge portion of the flooring is supported on the horizontal ledges formed by the lower flanges of the cross pieces 53. The pillars at this part of the vehicle also terminate at the intermediate cross pieces 53 of the truss members.

The rear end of the body frame is curved as shown in Figs. 1, 2, 3 and 4 and certain castings of special shape are required to fabricate this part of the vehicle. For instance, the rectangular framework of the members 51 at the rear end of the vehicle may have solid panels as shown at 75 (Fig. 1) and each member 51 will have the proper curvature to give the required shape to the rear end of the vehicle. The pillars 50' at the rear end are wedge-shaped in cross section as shown in Fig. 2 in order to obtain the proper joints at the curve. Furthermore, the pillars 50' at the rear of the vehicle do not extend above the window copes 74. The two rear carlin braces shown at 76 are of special construction and curve downwardly and are fastened to one of the window copes 74 as shown at 77. A roof supporting member 78 is secured to the center portion of the last carlin as shown at 79 and curves downwardly to the rear window cope 74 where it is fastened as shown at 80.

The rear curved I-beam 8 is connected to the cross piece of two of the rear rectangular members 51 by means of the braces 81 (Fig. 2) and the ends of the I-beam are secured to the wall structures by means of brackets 81'. Each of these brackets may be secured to the upper surface of the I-beam and to the cross piece of one of the side rectangular members 51.

Referring now to the front end of the vehicle shown in Figs. 9, and 11 to 14 inclusive, it will be noted that the door frame 23 at each side of the vehicle takes the place of two pillars 50. Therefore, the door frame is provided with lugs which are bolted or riveted between the transom frames in place of the upper ends of the pillars. The door frame is a little wider than the distance between two pillars and therefore each door frame is provided with two sets of lugs, one set designated 78' being utilized in securing the door frame at the right side of the vehicle and the other set 79' being utilized in securing the door frame at the other side of the vehicle. This arrangement permits both door frames to be cast alike as they are interchangeable. As will be noted from Fig. 12 a part of the upper cross piece of the door frame is curved as shown at 82 so as to conform with the curvature of the upper ends of the pillars. The forward transom frame at each side of the vehicle is of special construction and has a downwardly curved extremity as shown at 83 in Fig. 9 to give the proper configuration to the forward edge of the roof. The particular construction of the remaining parts is immaterial, suffice it to say that a rectangular window frame is formed at each side of the vehicle adjacent the driver's seat by properly positioning additional castings 84 (Fig. 9), and a rectangular transversely extending frame 85 is secured in place between the two end transom frames 83, the frame 85 being supported at its central portion by means of a brace 86 which is secured to the dash casting 32.

The entire weight of the forward end of the body frame is supported on rollers 87 mounted on the front bogie frame and which cooperate with the under surface of the curved I-beam 34, and on rollers 87' mounted on the brackets 47 and which cooperate with plates 88 associated with the front bogie frame. The curved I-beam 34, together with its rollers, and the plates 88 together with their rollers, constitute the fifth wheel construction referred to above. Likewise, the entire weight of the rear end of the vehicle is supported on rollers 89 mounted on the rear bogie frame which cooperate with the under surface of the curved I-beam 8, and on rollers 89' mounted in the brackets 90 and which cooperate with flat plates 91 associated with the rear bogie frame. The curved I-beam 8, together with its rollers, and the plates 91 together with their rollers, constitute the fifth wheel construction for the rear bogie truck.

The particular manner in which the body is finished off is immaterial to the invention. Sheathing, preferably of aluminum wherever possible, is applied to the metal framework and the various window, transom and door sashes and other accessories are applied so that the complete vehicle will have the general appearance shown in Fig. 15.

It will now be seen that the body frame is built up of structural members in such a way that the body frame itself takes the stresses which result from the bridge like support of the body frame upon the front and rear bogie trucks. There is no chassis frame or under frame of any kind which spans the distance from one bogie truck to the other and upon which the body frame is built and supported. On the contrary the body frame, by reason of its truss construction supports the entire weight of the body, and takes all of the stresses notwithstanding the fact that it is provided with relatively large door openings. The door frames together with the castings 27 and 29 and the large dash casting 32 play an important part in the support of the body frame because they form a direct structural connection between each series of truss members 51 and the curved I-beam 34. Moreover, the triangularly arranged struts, ties and braces 42, 43 and 45 play an important part in supporting the body frame as a great deal of the weight of the body frame is transmitted to the front bogie truck by the rollers 86 on the brackets 47. This results in a tendency for the forwardly projecting engine bed (plates 37, angle bars 40, etc.) to buckle where it joins the rest of the body frame, but the inclined compression struts 42 directly oppose this action. It will therefore be clear that these particular stresses are transmitted through the inclined struts 42 to the upper part of the dash casting 32 and then downwardly through the tension tie-plates 43 to the castings 29. When these particular stresses reach the castings 29 they are transmitted backwardly through the castings 27, door frames and then the series of truss members making up the side walls of the body frame.

It will be noted that most of the parts entering into the construction of the body frame are identical in construction and the greater part of the body is built up by annexing duplicate pillars, truss members, transom frames, etc. until a body frame of the desired length is obtained. In other words, the body frame may be made longer or shorter merely by using a larger or smaller number of truss members, pillars, etc. Of course, when the rear end of the body frame is reached the castings are of special construction, and certain special castings are necessary for the front end of the body frame as pointed out above. The intermediate portion of the body frame, however, is made up of identical units which may be bolted or riveted together to produce a body frame of any desired length.

The particular vehicle shown in the drawings is of great length and if a chassis frame were employed it would have to be of such special construction that the vehicle would not be practical as a road vehicle. Every vehicle of the type herein disclosed must have some sort of a body frame and by making it of a special construction as herein set forth it not only performs its usual function of a body frame, but also performs the function of a chassis frame, thus enabling an extra chassis frame to be entirely eliminated. On account of the length of the body frame it must possess great mechanical strength in order to enable it to be supported in a bridge-like manner on the bogies. Due to the large amount of metal which must enter into the construction of a body frame of such size and strength, the weight under ordinary conditions would be so great as to make the vehicle impractical for use as a road vehicle. As above stated nearly all of the parts of the body frame are aluminum-alloy castings and by making the frame of truss construction great mechanical strength and extreme lightness in weight are obtained.

It will now be seen that the weight of the vehicle is reduced to practical limits by the elimination of a heavy chassis frame and by increasing the strength of the body frame without increasing its weight, the weight of the frame in fact, being reduced.

Due to the fact that the intermediate portion of the body is built from duplicated units the body frame may be quickly constructed as the parts of the framework may be rapidly assembled and secured together.

I claim:

1. A vehicle comprising a body frame having a floor structure, side wall structures and a roof structure, the wall structures comprising a plurality of jointed units, and front and rear sets of wheels upon which the ends of the body frame are supported so that at least a portion of the stresses resulting from the support of said body frame are received by the wall structures, one of the units in at least one of the wall structures being a door frame which is the sole load transferring member between the parts intermediate which it is located.

2. A vehicle in accordance with claim 1 in which one of the units in each of the side wall structures is a door frame which is the sole load transferring member between the parts intermediate which it is located.

3. A vehicle comprising a body frame, front and rear sets of wheels on which the ends of the body frame are supported, said body frame including a dash member, a door frame member structurally connected with said dash member at each side of the vehicle, a series of truss units and interposed pillars structurally connected with each door frame, and a roof frame supported by the pillars and by the door frames, the stresses resulting from supporting the body frame at its ends being received by said truss units, door frames and dash casting.

4. In a vehicle in accordance with claim 3, an engine bed structure projecting forwardly from the dash member, at least part of the weight of the body being transmitted to the front set of wheels through said engine bed structure.

5. In a vehicle in accordance with claim 3, an engine bed structure projecting forwardly from the dash member, at least part of the weight of the vehicle being transmitted to the front set of wheels through said engine bed structure, and compression struts extending from the dash member to the engine bed structure.

6. A vehicle comprising a body frame, front and rear sets of wheels on which the ends of the body frame are supported, said body frame having side wall structures and a dash member extending between and interconnecting the side wall structures, an engine bed structure extending forwardly from the dash member, side wall structures having portions extending forwardly beyond the dash member, compression struts connected between the dash member and the engine bed structure, and tie-plates connecting the dash member with said forwardly extending portions of the side structures, at least some of the weight of the body frame being transmitted to the front set of wheels through the side wall structures, dash member and engine bed structure.

7. A vehicle comprising a body frame, front and rear sets of wheels on which the ends of the body frame are supported, said body frame comprising side wall structures, a dash casting extending between and interconnecting the side wall structures, the load being transmitted to the front set of wheels through said side wall structures and said dash casting.

8. A body frame for vehicles comprising a side wall structure, a member spaced inwardly from the side wall structure and extending longitudinally of the vehicle, a floor structure supported in part by said longitudinally extending member and rigidly connected to said side wall structure above its lower edge to structurally brace the same and horizontal braces interconnecting the wall structure with said longitudinally extending member at a lower level than the floor structure.

9. A vehicle comprising a body frame, front and rear sets of wheels upon which the frame is supported, said body frame having side wall structures, and a dash member extending between and interconnecting the side wall structures, an engine bed structure extending forwardly from the dash member, the forward end of the body frame being supported on the front set of wheels at at least one point under the engine bed structure, the entire load being supported on the front set of wheels through the side wall structures, dash member and engine bed structure.

10. A vehicle comprising a body frame, front and rear sets of wheels on which the frame is supported, said body frame having side wall structures, and a dash member extending between and interconnecting the side wall structures, and means for supporting the dash member and the forward end of the side wall structures on the front set of wheels whereby the major portion of the load is supported directly on the front set of wheels by the dash member and by the forward ends of the wall structures.

11. In a vehicle in accordance with claim 10 a structure extending forwardly from the dash member, and one part of a king pin combination associated with said structure whereby a pivotal connection is established with the front set of wheels.

12. In a vehicle in accordance with claim 10 a structure extending forwardly from the dash member, one part of a king pin combination associated with said structure whereby a pivotal connection is established with the front set of wheels, and compression and tension members bracing said structure with respect to the dash member.

13. A vehicle comprising a body frame having side wall structures and a roof structure bracing the wall structures at their upper portions, means for bracing the wall structures at their lower portions, and a substantially rigid floor structure rigidly connected with the wall structures above said means, and serving as intermediate bracing means for the wall structures.

14. A vehicle having a body frame the major portion of which is made up of joined duplicate units, said units comprising upright pillars having inwardly curved upper extremities, rectangular transom frames between each pair of which the upper end of one of the pillars is rigidly secured, and roof carlins each of which has its extremity positioned between two transom frames and rigidly secured to them.

15. A vehicle comprising a body frame having side wall structures, front and rear sets of wheels upon which the body frame is supported, said wall structures being made up of individual units joined together, each unit serving as the sole load transferring member intermediate the parts of the body frame between which it is located to transmit the load placed thereon incident to the support of the entire body structure.

16. A vehicle in accordance with claim 15 in which the units include rectangular truss members.

17. A vehicle in accordance with claim 15, in which the units each comprise an open frame and compression and tension members within said frame.

18. A vehicle in accordance with claim 15, in which the units each comprise an open rectangular frame and rigid diagonals within said frame, said diagonals being ribbed longitudinally.

19. A vehicle in accordance with claim 15 in which the units include rectangular truss members and vertical pillars, each pair of truss members having a pillar interposed between them, the two truss members of such pair being rigidly secured to the intervening pillar.

20. A vehicle in accordance with claim 15 in which at least one of the units is a door frame.

21. A vehicle comprising front and rear sets of wheels, a body frame having side walls composed of a plurality of truss units joined end to end and supported upon the wheels, roof and floor structures supported by the side walls, the truss structure of the side walls supporting substantially the entire load of the body frame and transmitting this load to the wheels.

22. A vehicle body frame comprising side wall structures, roof and floor structures supported by the wall structures, said body frame being adapted to be supported upon front and rear sets of wheels, the side wall structures of said body frame receiving the major portion of the load incident to the support of the frame itself, the load transferring members of the side wall structures consisting solely of a plurality of separately formed units joined end to end.

23. A vehicle body comprising a side wall structure, said side wall structure consisting of a composite truss formed of elements arranged end to end and adapted to transfer the load to each other, a roof structure supported by the side walls structure, and a floor structure supported by the side wall structure, the side wall structure being adapted to be mounted on the vehicle wheels and to transfer the vehicle load thereto.

In testimony whereof I affix my signature.

OLIVER F. WARHUS.

CERTIFICATE OF CORRECTION.

Patent No. 1,673,786.                              Granted June 12, 1928, to

OLIVER F. WARHUS.

It is hereby certified that error appears in the printed specification of the above numbered patent requiring correction as follows: Page 5, line 89, claim 1, for the word "jointed" read "joined", and line 116, claim 3, for the word "casting" read "member"; page 6, lines 23 and 27, claim 7, for the word "casting" read "member"; and that the said Letters Patent should be read with these corrections therein that the same may conform to the record of the case in the Patent Office.

Signed and sealed this 10th day of July, A. D. 1928.

(Seal)

M. J. Moore,
Acting Commissioner of Patents.

21. A vehicle comprising front and rear sets of wheels, a body frame having side walls composed of a plurality of truss units joined end to end and supported upon the wheels, roof and floor structures supported by the side walls, the truss structure of the side walls supporting substantially the entire load of the body frame and transmitting this load to the wheels.

22. A vehicle body frame comprising side wall structures, roof and floor structures supported by the wall structures, said body frame being adapted to be supported upon front and rear sets of wheels, the side wall structures of said body frame receiving the major portion of the load incident to the support of the frame itself, the load transferring members of the side wall structures consisting solely of a plurality of separately formed units joined end to end.

23. A vehicle body comprising a side wall structure, said side wall structure consisting of a composite truss formed of elements arranged end to end and adapted to transfer the load to each other, a roof structure supported by the side walls structure, and a floor structure supported by the side wall structure, the side wall structure being adapted to be mounted on the vehicle wheels and to transfer the vehicle load thereto.

In testimony whereof I affix my signature.

OLIVER F. WARHUS.

CERTIFICATE OF CORRECTION.

Patent No. 1,673,786.　　　　　　　　　　　　　　Granted June 12, 1928, to

OLIVER F. WARHUS.

It is hereby certified that error appears in the printed specification of the above numbered patent requiring correction as follows: Page 5, line 89, claim 1, for the word "jointed" read "joined", and line 116, claim 3, for the word "casting" read "member"; page 6, lines 23 and 27, claim 7, for the word "casting" read "member"; and that the said Letters Patent should be read with these corrections therein that the same may conform to the record of the case in the Patent Office.

Signed and sealed this 10th day of July, A. D. 1928.

(Seal)

M. J. Moore,
Acting Commissioner of Patents.